United States Patent
Jeon et al.

(10) Patent No.: US 12,323,376 B2
(45) Date of Patent: Jun. 3, 2025

(54) METHOD FOR PROVIDING MESSENGER SERVICE, AND APPARATUS FOR IMPLEMENTING THE SAME

(71) Applicant: SAMSUNG SDS CO., LTD., Seoul (KR)

(72) Inventors: Kyea Min Jeon, Seoul (KR); Ju Yeon Yook, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/384,543

(22) Filed: Oct. 27, 2023

(65) Prior Publication Data

US 2024/0146680 A1 May 2, 2024

(30) Foreign Application Priority Data

Oct. 28, 2022 (KR) .................... 10-2022-0141453

(51) Int. Cl.
*H04L 51/216* (2022.01)
*H04L 51/04* (2022.01)

(52) U.S. Cl.
CPC ............ *H04L 51/216* (2022.05); *H04L 51/04* (2013.01)

(58) Field of Classification Search
CPC .............................. H04L 51/216; H04L 51/04
See application file for complete search history.

(56) References Cited

U.S. PATENT DOCUMENTS

| | | | |
|---|---|---|---|
| 8,006,191 B1* | 8/2011 | Anderson | H04L 12/1827 715/753 |
| 11,178,087 B2 | 11/2021 | Narayanswamy et al. | |
| 2016/0191578 A1* | 6/2016 | Kim | H04L 12/1822 709/204 |
| 2017/0032021 A1* | 2/2017 | Watanachote | H04L 51/52 |
| 2017/0034226 A1* | 2/2017 | Bostick | G06V 40/172 |
| 2020/0133439 A1* | 4/2020 | Trim | H04L 51/216 |
| 2021/0256534 A1* | 8/2021 | An | G06N 3/08 |
| 2022/0108413 A1* | 4/2022 | Hack | G06Q 50/20 |
| 2022/0200945 A1* | 6/2022 | Summers | H04L 51/212 |
| 2022/0327285 A1* | 10/2022 | Harichandra Babu | G06F 3/0482 |
| 2023/0379286 A1* | 11/2023 | Maruyama | H04L 51/216 |

FOREIGN PATENT DOCUMENTS

| | | |
|---|---|---|
| CN | 114500420 A | 5/2022 |
| KR | 10-1980681 B1 | 5/2019 |
| KR | 10-2282376 B1 | 7/2021 |
| KR | 10-2310065 B1 | 10/2021 |
| KR | 10-2022-0064668 A | 5/2022 |
| KR | 10-2402249 B1 | 5/2022 |

* cited by examiner

*Primary Examiner* — William G Trost, IV
*Assistant Examiner* — Adam A Cooney
(74) *Attorney, Agent, or Firm* — Sughrue Mion, PLLC

(57) ABSTRACT

A method for providing a messenger service, which is performed by at least one processor, includes: creating a conversation group by grouping conversations relevant to a first conversation of a plurality of conversations displayed in a chat room; and providing at least one recommended target screen based on a target-relevant word included in the conversation group.

17 Claims, 14 Drawing Sheets

METHOD FOR PROVIDING MESSENGER SERVICE, AND APPARATUS FOR IMPLEMENTING THE SAME

CROSS-REFERENCE TO RELATED APPLICATION(S)

This application is based on and claims priority under 35 U.S.C. § 119 to Korean Patent Application No. 10-2022-0141453, filed on Oct. 28, 2022, in the Korean Intellectual Property Office, the disclosure of which is incorporated by reference herein in its entirety.

BACKGROUND

1. Field

The disclosure relates to a method for providing a messenger service, and an apparatus for implementing the same. More particularly, the disclosure relates to a method for providing a messenger service in order to provide a relevant screen using conversations in a chat room, and an apparatus for implementing the same.

2. Description of the Related Art

Conversations on a messenger are often transmitted in a form in which one sentence divided into several sentences rather than a form in which contents of the conversation are transmitted at once due to colloquial characteristics.

Because of such characteristics, there is a problem that the conversations on the messenger do not have a form in which their contents are organized, and a range of conversations to be analyzed is ambiguous in many cases, thus it is difficult to analyze the conversations. For this reason, it is difficult to develop a service that analyzes the conversations on the messenger and connects target systems (e.g., task systems) such as schedules, e-mails, and payments.

Conventionally, there is a function of linking with a calendar service through an automatically generated link for a date in a conversation related to the date on the messenger, but such a function was one-dimensional and does not provide great convenience to a user in a conversation process through the messenger.

In addition, a conventional messenger has a limitation in that an accurate keyword should be input in order for a task system preset for the keyword to be linked.

Accordingly, there is a need for a technology capable of automatically providing a relevant task system by analyzing a series of conversation contents, thus the user does not need to directly think about what task system is relevant to the contents of the conversations on the messenger.

In addition, there is a need for a technology that enables fast task processing with accurate linkage with the task system while reducing unnecessary operations such as exiting and entering the messenger in order to access a task system screen during a conversation on the messenger.

SUMMARY

Aspects of the disclosure provide a method for providing a messenger service capable of linking with a relevant target system by analyzing a series of conversation contents during a conversation on a messenger, and an apparatus for implementing the same.

Aspects of the disclosure also provide a method for providing a messenger service capable of providing a convenient interface so as to access a target system relevant to conversation contents without moving to another screen during a conversation on a messenger, and an apparatus for implementing the same.

Aspects of the disclosure also provide a method for providing a messenger service capable of recommending a target system having high linkage even when a range of conversations having the same subject is ambiguous during a conversation on a messenger, and an apparatus for implementing the same.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of the disclosure, a method for providing a messenger service, the method being performed by at least one processor and includes: creating a conversation group by grouping conversations relevant to a first conversation of a plurality of conversations displayed in a chat room; and providing at least one recommended target screen based on a target-relevant word included in the conversation group.

In some embodiments, the creating of the conversation group includes: calculating conversation relevance scores to the first conversation for each of the conversations in the chat room; and creating the conversation group based on conversations in which a difference in the conversation relevance scores between neighboring conversations is greater than or equal to a first reference value.

In some embodiments, the calculating of the conversation relevance scores to the first conversation includes calculating the conversation relevance scores based on at least one of a first relevance index, a second relevance index, or a third relevance index between each of the conversations in the chat room and the first conversation, wherein the first relevance index is calculated based on a common word between the first conversation and another conversation, wherein the second relevance index is calculated based on a time difference between the first conversation and another conversation, and wherein the third relevance index is calculated based on a distance between the first conversation and another conversation.

In some embodiments, the calculating of the conversation relevance scores based on at least one of the first relevance index, the second relevance index, or the third relevance index includes:
  determining weights for each of the first relevance index, the second relevance index, and the third relevance index; and calculating the conversation relevance scores to the first conversation by performing, based on the determined weights, a weighted sum on the first relevance index, the second relevance index, and the third relevance index.

In some embodiments, the creating of the conversation group includes, based on a determination that there are no conversations in which the difference in the conversation relevance scores between the neighboring conversations is greater than or equal to the first reference value among the conversations in the chat room, adjusting the determined weights.

In some embodiments, the calculating of the conversation relevance scores based on at least one of the first relevance index, the second relevance index, or the third relevance index includes: based on a determination that an utterer is the same as an utterer of the first conversation for each of the conversations in the chat room, calculating a fourth relevance index to the first conversation; and calculating the conversation relevance scores based on at least one of the first relevance index, the second relevance index, or the third relevance index, and the fourth relevance index.

In some embodiments, the calculating of the conversation relevance scores based on at least one of the first relevance index, the second relevance index, or the third relevance index, and the fourth relevance index includes: based on a determination that the fourth relevance index is lower than a second reference value, adjusting a weight for at least one of the first relevance index, the second relevance index, or the third relevance index; and calculating the conversation relevance scores by performing, based on the adjusted weight, a weighted sum on the first relevance index, the second relevance index, the third relevance index, and the fourth relevance index.

In some embodiments, the providing of the at least one recommended target screen includes: identifying element items of a first target corresponding to the target-relevant word among a plurality of targets; and generating the at least one recommended target screen in which words matched with each of the element items of the first target among the conversations included in the conversation group are automatically input.

In some embodiments, the providing of the at least one recommended target screen includes, based on a determination that a number of targets relevant to the at least one recommended target screen is two or more, sorting and displaying respective recommended target screens based on a number of element items comprising a matched word among element items of targets displayed on the respective recommended target screens.

In some embodiments, the generating of the at least one recommended target screen includes receiving an input for an element item that does not have the matched word among the element items of the first target and displaying the at least one recommended target screen.

In some embodiments, the method further includes, based on a determination that a number of element items that do not have the matched word among the element items of the first target is greater than or equal to a reference value, increasing a range of the conversations included in the conversation group.

In some embodiments, the creating of the conversation group includes creating the conversation group based on a user's input selecting the first conversation.

In some embodiments, the creating of the conversation group includes, based on a determination that the first conversation includes the target-relevant word, creating the conversation group.

In some embodiments, the providing of the at least one recommended target screen includes: receiving information on element items of a first target corresponding to the target-relevant word from an external server that stores information on each of a plurality of targets; and generating the at least one recommended target screen using the received information on the element items of the first target.

According to an aspect of the disclosure, a non-transitory computer-readable recording medium storing computer program, which, when executed by at least one processor, causes the at least one processor to execute: create a conversation group by grouping conversations relevant to a first conversation of a plurality of conversations displayed in a chat room; and provide at least one recommended target screen based on a target-relevant word in the conversation group.

According to an aspect of the disclosure, a messenger client terminal includes: one or more processors; a communication interface configured to communicate with an external apparatus; and a memory configure to load a computer program executable by the one or more processors; and wherein the computer program includes instructions for performing: creating a conversation group by grouping conversations relevant to a first conversation of a plurality of conversations displayed in a chat room; and providing at least one recommended target screen based on a target-relevant word included in the conversation group.

In some embodiments, the creating of the conversation group includes: calculating a conversation relevance score to the first conversation based on a common word between the first conversation and another conversation, and creating the conversation group based on the calculated conversation relevance score.

In some embodiments, the providing of the at least one recommended target screen includes: receiving information on element items of a first target corresponding to the target-relevant word from the external apparatus that stores information on each of a plurality of targets, and generating the at least one recommended target screen in which words matched with each of the element items of the first target among the conversations included in the conversation group are automatically input.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Figure 1:
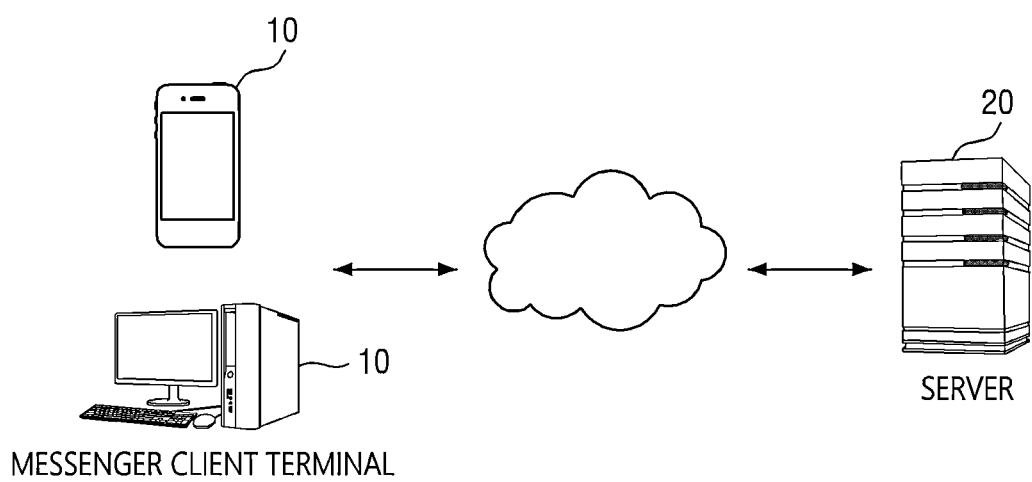
FIG. 1 is a diagram illustrating a configuration of a system for providing a messenger service according to an example embodiment of the disclosure.

Hereinafter, preferred embodiments of the disclosure will be described with reference to the attached drawings. The advantages and features of the disclosure and methods of accomplishing the same may be understood more readily by reference to the following detailed description of preferred embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims and their equivalents.

In adding reference numerals to the components of each drawing, the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

The terms "transmit", "receive", and "communicate" as well as the derivatives thereof encompass both direct and indirect communication. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more.

Hereinafter, some embodiments of the disclosure will be described in detail with reference to the accompanying drawings.

FIG. 1 is a diagram illustrating a configuration of a system for providing a messenger service according to an example embodiment of the disclosure. Referring to FIG. 1, the system according to an example embodiment of the disclosure includes a messenger client terminal 10 and a server 20, and the messenger client terminal 10 is connected to the server 20 through a network.

The messenger client terminal 10 may be implemented as a terminal that provides a function of providing a screen of a target system (e.g., task system) related to a specific conversation of a plurality of conversations displayed in a chat room of a messenger. In this case, the messenger client terminal 10 may receive information on the task system related to the specific conversation from the server 20 in order to provide the screen of the task system related to the specific conversation. The messenger client terminal 10 may be, for example, any one of a mobile computing apparatus such as a smartphone, a tablet personal computer (PC), a laptop computer, and a personal digital assistant (PDA), and a fixed computing apparatus such as a desktop PC.

The messenger client terminal 10 creates a conversation group by grouping conversations relevant to a first conversation of the plurality of conversations displayed in the chat room. Here, the first conversation may be selected by a user input or automatically selected when a word related to a target (e.g., task) such as an e-mail, a payment, or a schedule is sensed. In this case, the conversations relevant to the first conversation may be continuous conversations displayed before and after the first conversation or non-continuous conversations excluding some conversations less related to contents of the first conversation.

As an example embodiment, the messenger client terminal 10 may calculate conversation relevance scores to the first conversation for each of the conversations in the chat room, and create a conversation group using the calculated conversation relevance scores. In this case, the conversation relevance score to the first conversation may be calculated based on whether or not a common word is included, a time difference from the first conversation, a distance difference from the first conversation within the chat room, and the like.

As an example embodiment, the messenger client terminal 10 may create the conversation group on the basis of conversations in which a difference in the conversation relevance score between neighboring conversations is greater than or equal to a reference value among the conversations in the chat room when it creates the conversation group using the conversation relevance scores calculated as described above.

The messenger client terminal 10 may display the conversation group created as described above by, for example, a box, a boundary line, a color, or the like, so that the conversation group is identified within the chat room. In this case, words related to task among words included in each of the conversations of the conversation group may be displayed in, for example, a bubble form.

The messenger client terminal 10 provides at least one recommended task screen based on a target-relevant word (e.g., task-relevant word) included in the conversation group.

The messenger client terminal 10 may extract words highly related to a plurality of task systems through morphological analysis of a plurality of words included in the conversations of the conversation group. In this case, the messenger client terminal 10 may select a word having the highest relevance to the task system among the extracted words as a task-relevant word, and provide a screen of the task system related to the selected task-relevant word as a recommended task screen.

As an example embodiment, the messenger client terminal 10 may generate and display the screen of the task system using information on element items related to the task system corresponding to the task-relevant word selected through the morpheme analysis. In this case, the messenger client terminal 10 may request information on the task system corresponding to the task-relevant word from the server 20, and receive the information on the element items related to the task system corresponding to the task-relevant word from the server 20.

Accordingly, the messenger client terminal 10 may configure the screen of the task system using the information on the element items of the task system provided from the server 20.

According to the configuration of the system of the disclosure as described above, it is possible to provide a convenient interface so as to access a task system relevant to conversation contents without exiting the chat room or moving to another screen during a conversation on the messenger.

Figure 2:
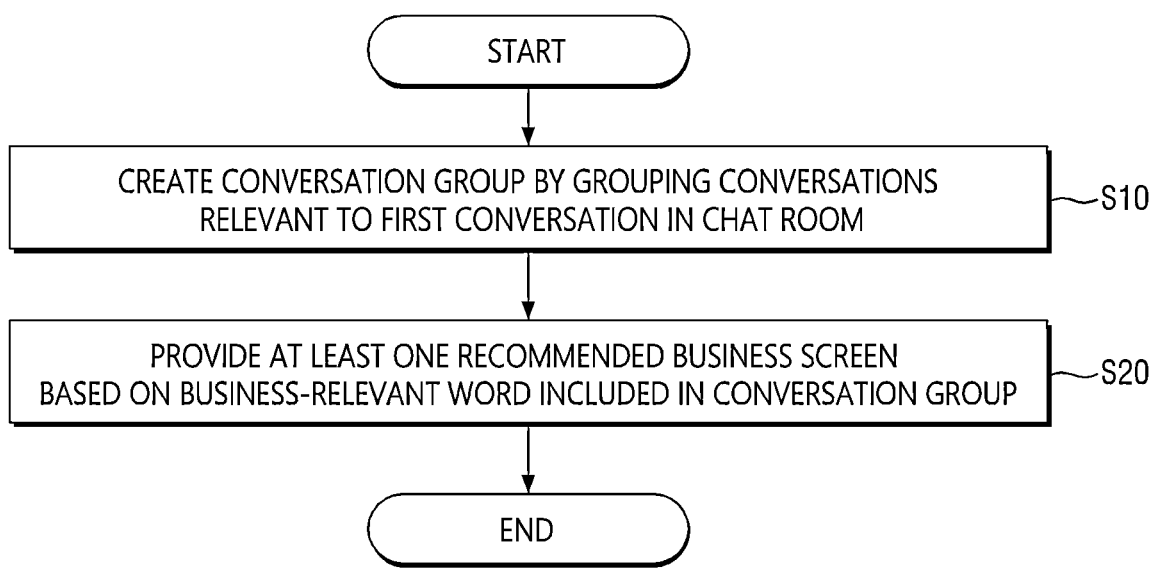
FIG. 2 is a flowchart for describing a method for providing a messenger service according to an example embodiment of the disclosure.

FIG. 2 is a flowchart for describing a method for providing a messenger service according to an example embodiment of the disclosure.

The method for providing a messenger service for task according to an example embodiment of the disclosure may be executed by the messenger client terminal 10 illustrated in FIG. 1. The messenger client terminal 10 executing the method according to the present example embodiment may be a computing device 100 illustrated in FIG. 14. The messenger client terminal 10 may be, for example, an apparatus capable of performing an arithmetic function, such as a smartphone, a tablet PC, a laptop computer, or a PC.

A description of a subject performing some operations included in the method according to an example embodiment of the disclosure may be omitted, and in such a case, the subject is the messenger client terminal 10.

According to an example embodiment of the disclosure to be described later, it is possible to recommend a screen of a task system relevant to a series of conversation contents during a conversation in a chat room of a messenger.

First, in operation S10, the messenger client terminal 10 creates a conversation group by grouping conversations relevant to a first conversation of a plurality of conversations displayed in the chat room. Here, when the first conversation is selected by a user input or it is sensed that the first conversation includes a keyword related to task, the conversation group may be created.

Figure 6:
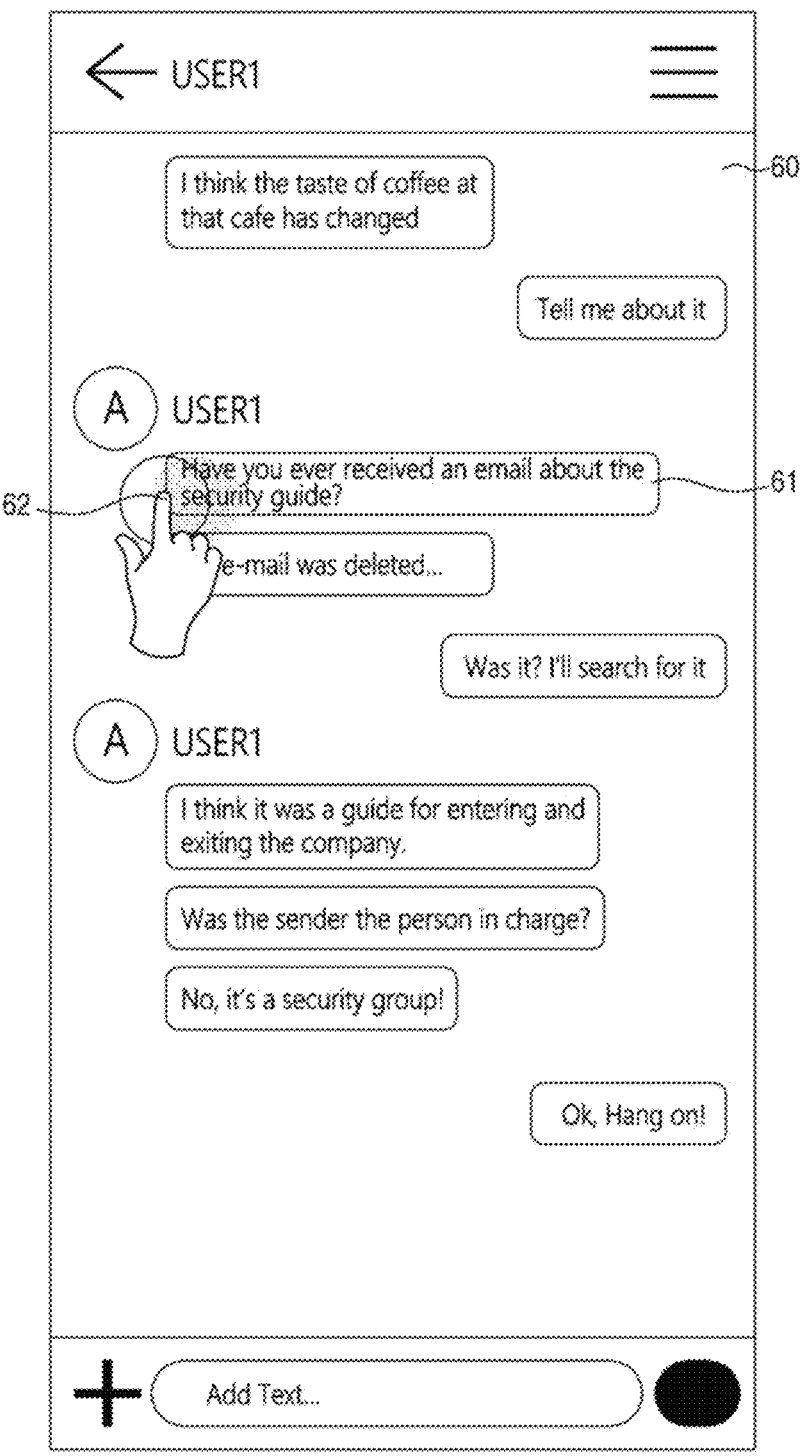
FIG. 6 is an example of a user input for creating a conversation group relevant to a first conversation of conversations displayed in a chat room according to some example embodiments of the disclosure.

As an example, referring to FIG. 6, when a long press input for a first conversation 61 of a plurality of conversations displayed in a chat room 60 is received, the messenger client terminal 10 may perform an operation of creating a conversation group by grouping conversations relevant to the first conversation 61.

As an example embodiment, the messenger client terminal 10 may calculate conversation relevance scores to the first conversation for each of the conversations in the chat room, and create a conversation group relevant to the first conversation using the conversation relevance scores.

Figure 3:
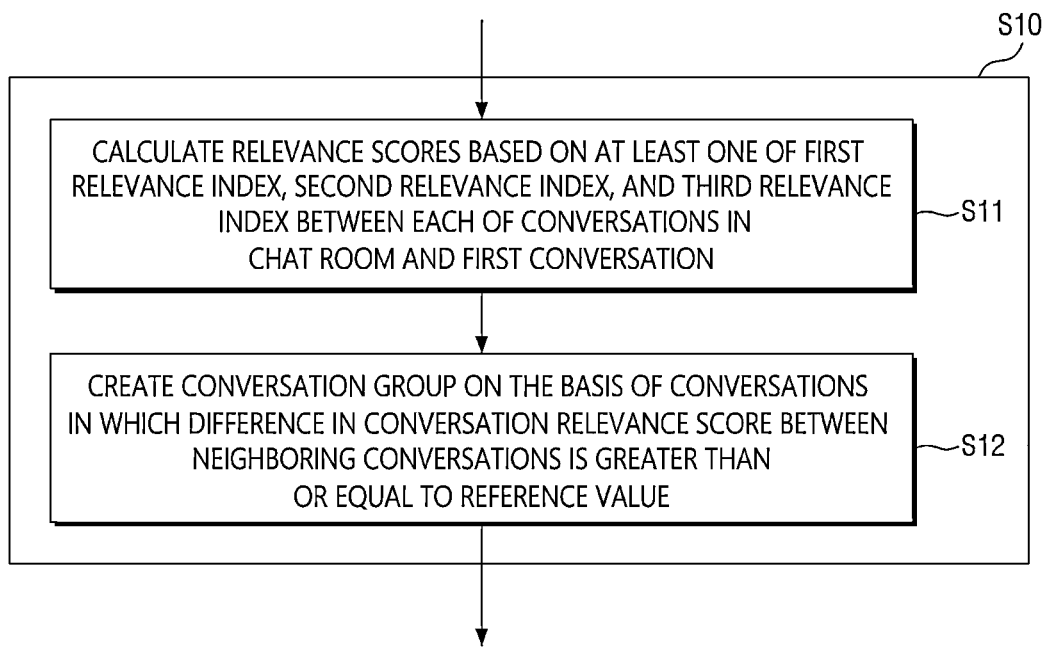
FIGS. 3 to 5 are flowcharts for describing detailed processes of some steps illustrated in FIG. 2.

Specifically, referring to FIG. 3, the operation S10 may include an operation S11 of calculating the conversation relevance scores based on at least one of a first relevance index, a second relevance index, and a third relevance index between each of the conversations in the chat room and the first conversation and an operation S12 of creating the conversation group on the basis of conversations in which a difference in the conversation relevance score between neighboring conversations is greater than or equal to a reference value among the conversations in the chat room.

In operation S11, the first relevance index may be calculated based on whether or not a common word is included between each conversation and the first conversation, the second relevance index may be calculated based on a time difference between each conversation and the first conversation, and the third relevance index may be calculated based on a distance difference between each conversation and the first conversation within the chat room.

Figure 8:
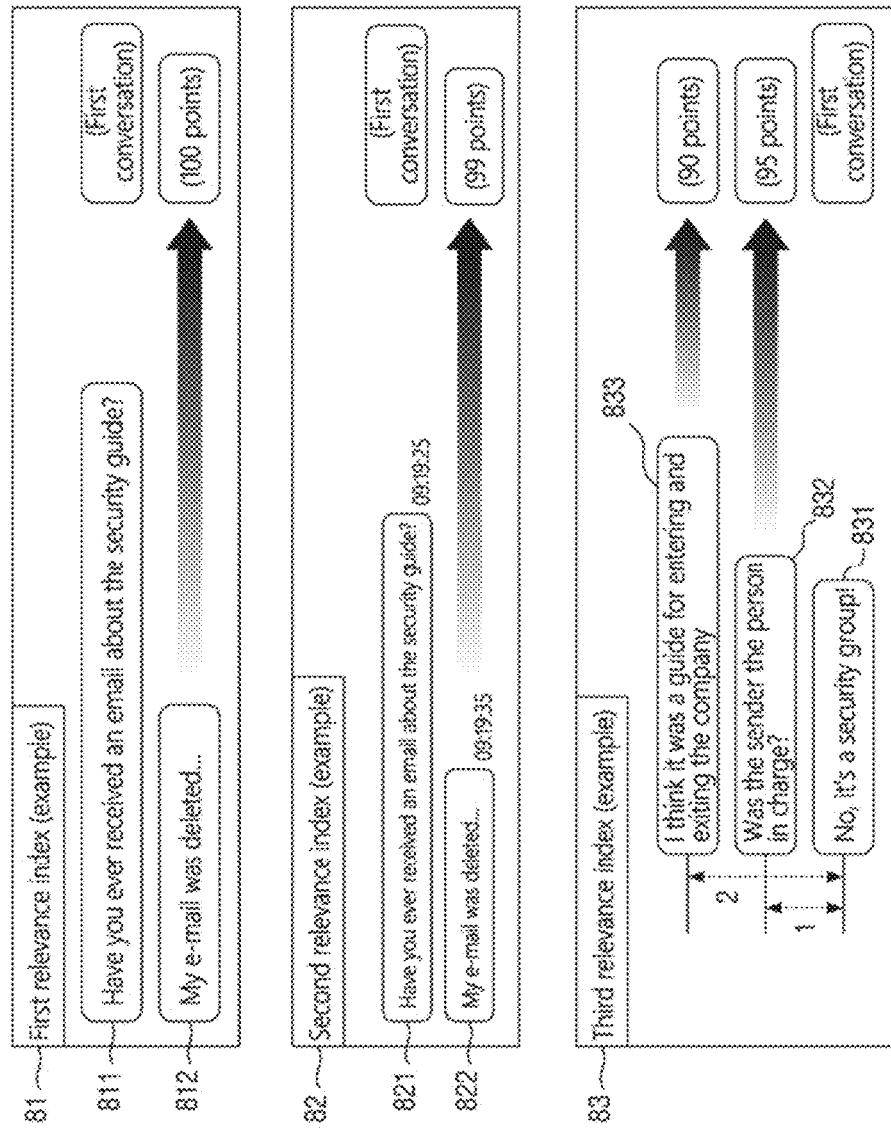
FIG. 8 is an example of calculating relevance indices to a first conversation for each of conversations according to some example embodiments of the disclosure.

As an example, referring to FIG. 8, the messenger client terminal 10 may assign one hundred (100) points, which is a maximum score, as a first relevance index 81 because 'e-mail' of 'e-mail' and 'security guide', which are main words of a first conversation 811 selected by a user input, is equally included, in calculating the first relevance index 81 for a conversation 812 'because my e-mail was deleted' among conversations in the chat room. When the same word as the main word of the first conversation 811 is not included, a higher score may be assigned as the first relevance index 81 as relevance to the main word is higher.

In addition, the messenger client terminal 10 may assign a higher score as a second relevance index 82 as an absolute value of a time difference from a selected first conversation 821 is lower, in calculating the second relevance index 82 for a conversation 822 'because my e-mail was deleted' among the conversations in the chat room. As an example, a time at which the first conversation 821 is recorded is 09:19:25 and a time at which the conversation 822 'because my e-mail was deleted' is recorded is 09:19:35, and a time difference from the first conversation 821 is very small, and thus, a high score such as 99 points may be assigned as the second association index 82.

In addition, the messenger client terminal 10 may assign a higher score as a third relevance index 83 as a block distance to a selected first conversation 831 is smaller, in calculating the third relevance index 83 for each of a conversation 832 'was the sender the person in charge?' and a conversation 833 'I think it was a guide for entering and exiting the company' among the conversations in the chat room. As an example, 95 points may be assigned as the third relevance index 83 to the conversation 832 from which a block distance to the first conversation 831 is 1, and 90 points may be assigned as the third relevance index 83 to the conversation 833 from which a block distance to the first conversation 831 is 2.

The messenger client terminal 10 may calculate the conversation relevance scores to the first conversation for each conversation using the first relevance index, the second relevance index, and the third relevance index assigned to each conversation in the chat room as described above.

As an example embodiment, the messenger client terminal 10 may calculate a conversation relevance score (Y) in a manner of determining weights for respective relevance indices, applying the determined weights to the respective relevance indices, and performing a weighted sum on the respective relevance indices to which the determined weights are applied, as represented in [Equation 1].

$$Y = W1 \times \text{Index } 1 + W2 \times \text{Index } 2 + W3 \times \text{Index } 3 \qquad \text{[Equation 1]}$$

In Equation 1, Y refers to a conversation relevance score, Index 1 refers to a first relevance index, Index 2 refers a second relevance index, Index 3 refers a third relevance index, W1 refers to a weight A, W2 refers to a weight B, and W3 refers to a weight C.

As an example, the messenger client terminal 10 may determine the weight A (W1) for the first relevance index (Index 1) as 0.5, determine the weight B (W2) for the second relevance index (Index 2) as 0.3, and determine the weight C (W3) for the third relevance index (Index 3) as 0.2. The weights determined for the respective relevance indices may be preset by a user or automatically adjusted so that an optimal conversation group relevant to the selected first conversation may be created. In addition, in the case of a corporate messenger, the respective weights may be set to be different from each other depending on characteristics of an industry section to which a corporate belongs.

Figure 4:
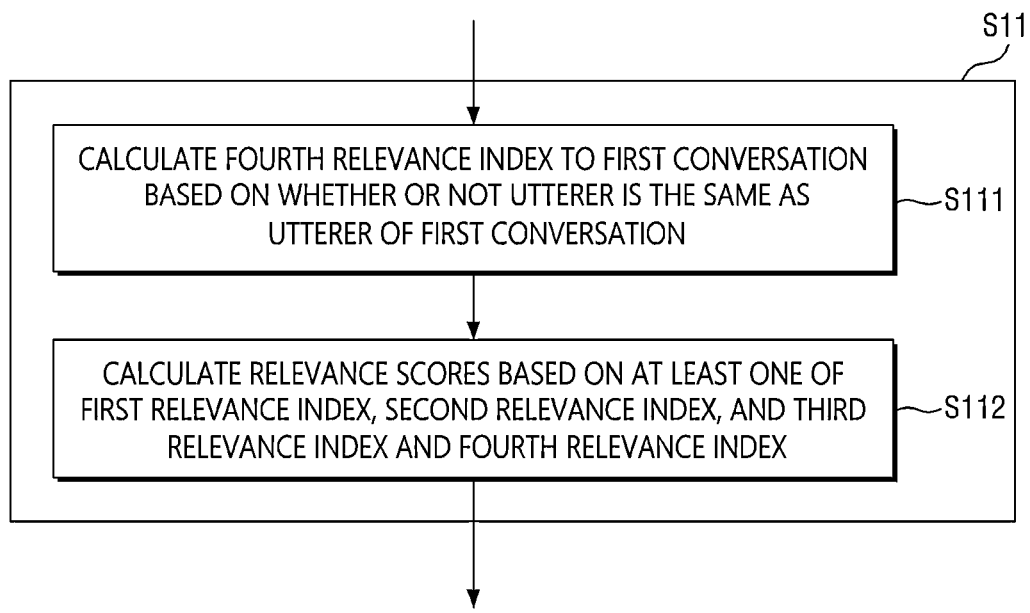

As an example embodiment, as illustrated in FIG. 4, the operation S11 may include an operation S111 of calculating a fourth relevance index to the first conversation based on whether or not an utterer is the same as an utterer of the first conversation for each of the conversations in the chat room and an operation S112 of calculating the conversation relevance scores based on at least one of the first relevance index, the second relevance index, the third relevance index, and the fourth relevance index.

That is, in the example of FIG. 8 described above, after the first relevance index 81, the second relevance index 82, and the third relevance index 83 to the first conversation selected by the user are calculated for each conversation displayed in the chat room, the fourth relevance index may be additionally calculated in a manner of assigning a higher score when an utterer of each conversation is the same as the utterer of the first conversation.

In this case, when the fourth relevance index is lower than a reference value, the weight for at least one of the first relevance index 81, the second relevance index 82, and the third relevance index 83 may be adjusted. As an example, since a conversation whose fourth relevance index is lower than the reference value is likely to be a conversation of an utterer different from an utterer of the first conversation, the weights for each of the third relevance index 83 based on the distance to the first conversation and the second relevance index 82 based on the time difference from the first conversation may be adjusted to be small. That is, when a conversation is the conversation of the utterer different from the utterer of the first conversation, by adjusting the weight of the third relevance index 83 to be small, an influence on the conversation relevance score may be reduced even though the distance to the first conversation is small. Similarly, when a conversation is the conversation of the utterer different from the utterer of the first conversation, by adjusting the weight of the second relevance index 82 to be small, an influence on the conversation relevance score may be reduced even though the time difference from the first conversation is small.

Accordingly, the messenger client terminal 10 may calculate the conversation relevance scores by performing a weighted sum on the first relevance index, the second relevance index, the third relevance index, and the fourth relevance index based on the adjusted weights.

As an example embodiment, in operation S12, the messenger client terminal 10 may create the conversation group having high relevance to the first conversation in a manner of grouping conversations between two boundaries with the conversations in which the difference in the conversation relevance score between the neighboring conversations is greater than or equal to the reference value as a boundary, using the conversation relevance scores calculated for each conversation in operation S11.

Figure 9:
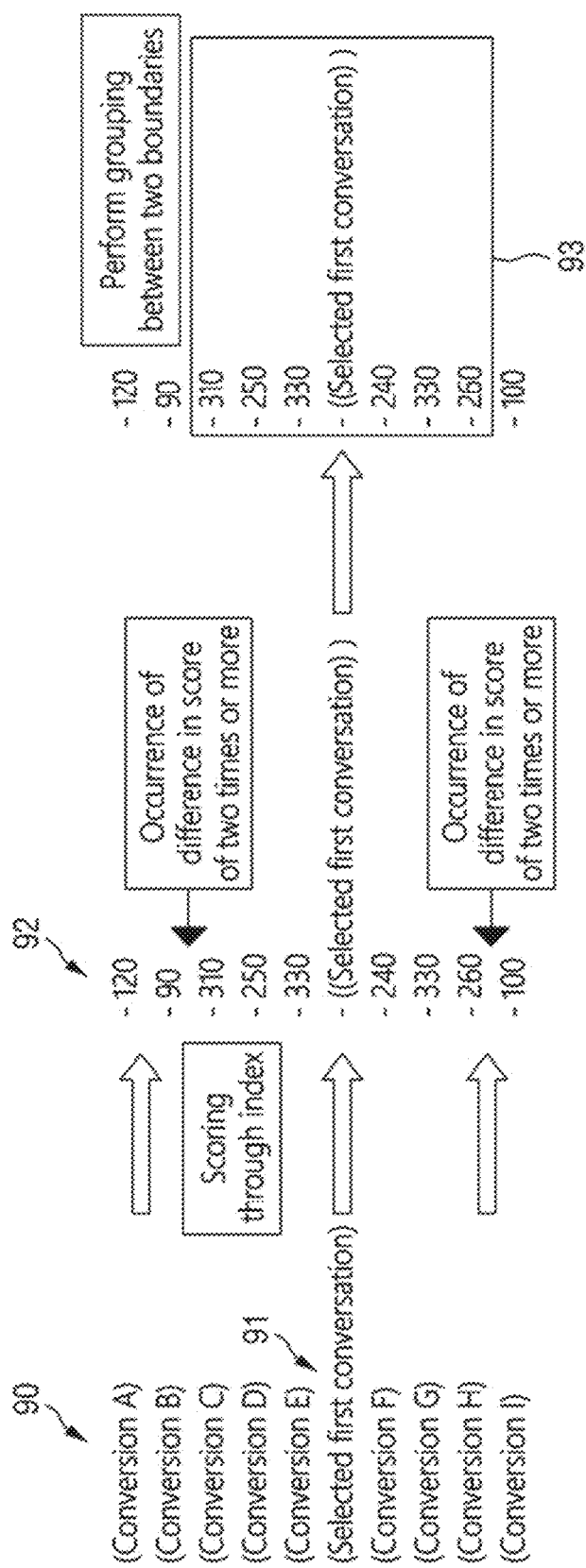
FIG. 9 is an example of creating a conversation group on the basis of conversation relevance scores calculated for each of the conversations according to some example embodiments of the disclosure.

As an example, referring to FIG. 9, each of conversation relevance scores 92 to a first conversation 91 selected by the user may be calculated for each of a plurality of conversations 90 in the chat room, and in this case, a point where a difference in the conversation relevance score between two neighboring conversations is two times or more may be found. That is, it may be confirmed that a conversation relevance score of conversation B is 90 and a conversation relevance score of conversation C is 310, and a difference in the conversation relevance score between conversation B and conversation C far exceeds two times. In addition, it may be confirmed that a conversation relevance score of conversation H is 260 and a conversation relevance score of conversation I is 100, and a difference in the conversation relevance score between conversation H and conversation I exceeds two times. In this case, conversations belonging to a box having a portion between conversation B and conversation C as a first boundary and having a portion between conversation H and conversation I as a second boundary may be created as one conversation group 30.

According to the example embodiment as described above, it is possible to group conversations having high relevance into one group even when a range of conversations having the same subject is ambiguous during a conversation in the chat room of the messenger.

Next, in operation S20 of FIG. 2, the messenger client terminal 10 provides at least one recommended task screen based on a task-relevant word included in the conversation group.

Figure 7:
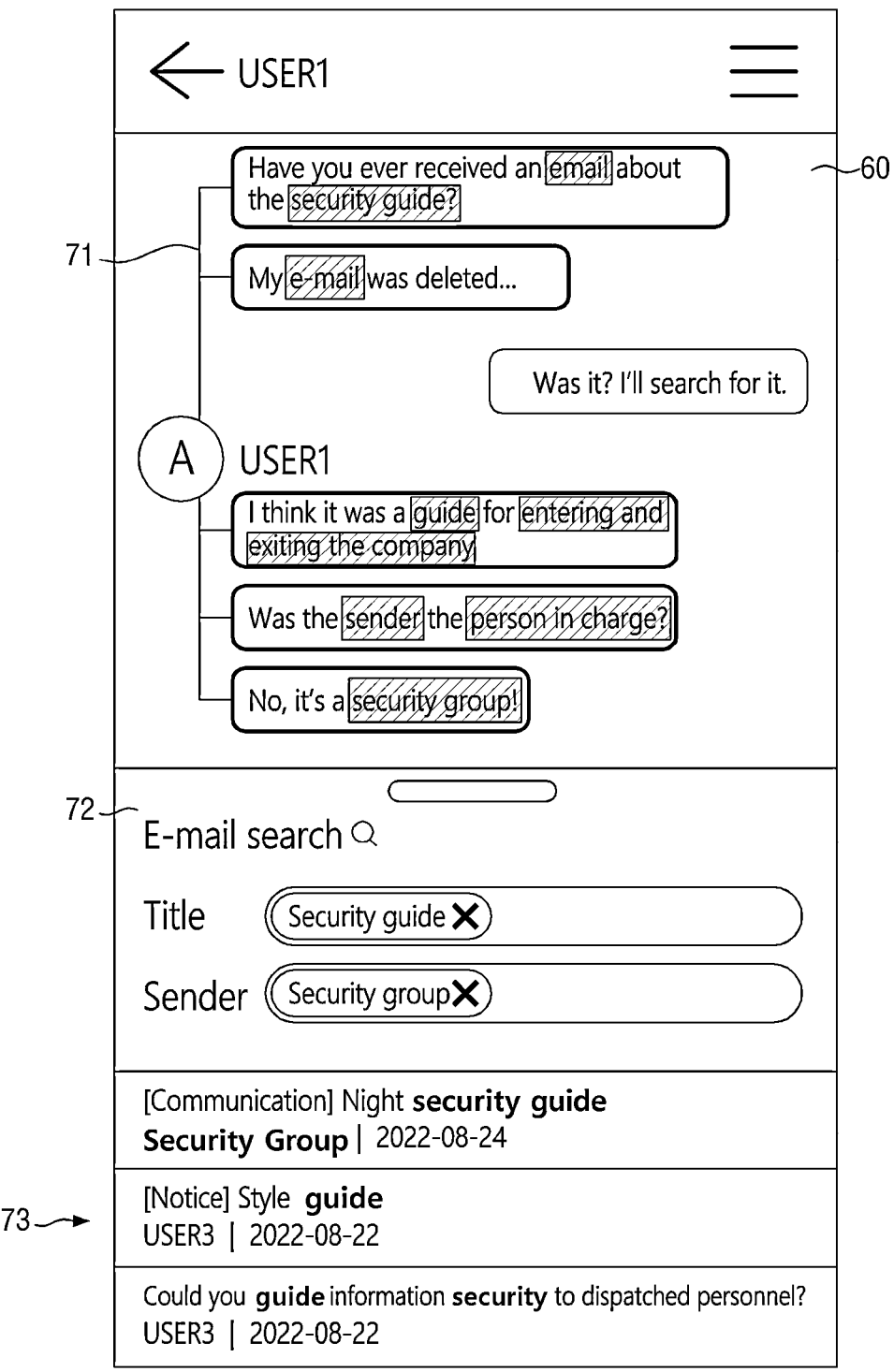
FIG. 7 is an example of providing a recommended task screen by analyzing a conversation group created according to the user input of FIG. 6.
Figure 10:
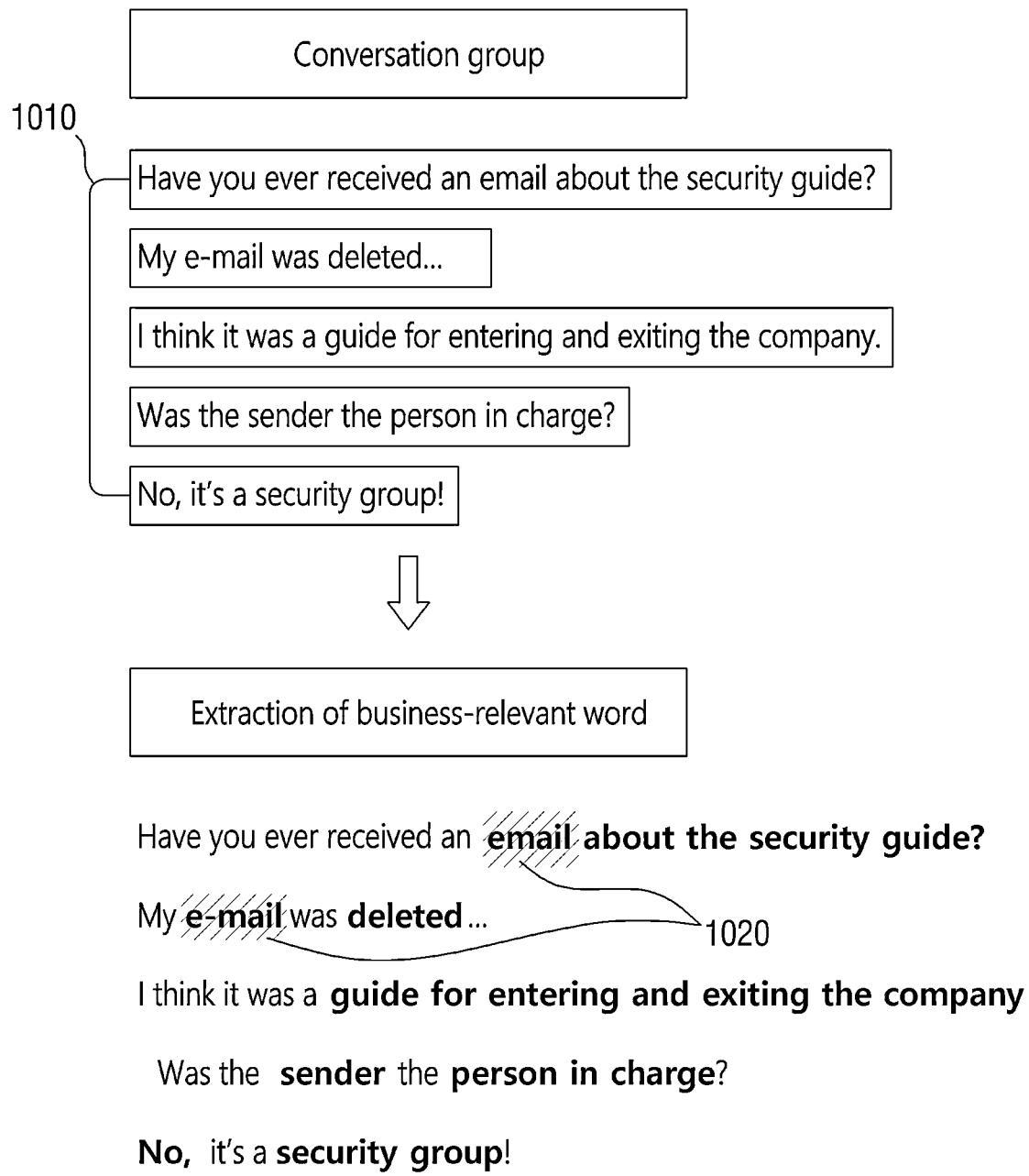
FIG. 10 is an example of extracting a task-relevant word included in the conversation group according to some example embodiments of the disclosure.

As an example, as illustrated in FIG. 7, when the first conversation 61 of the conversations in the chat room 60 in an example of FIG. 6 is selected by the long press input, the message client terminal 10 may create a conversation group 71 relevant to the first conversation 61. In this case, the messenger client terminal 10 may extract an 'e-mail' 1020 as a task-related word having the highest relevance to the task system among conversations 1010 included in the conversation group 71 using a morpheme analysis algorithm, as illustrated in FIG. 10. In addition, the messenger client terminal 10 may display an 'e-mail search screen' 72 on the same screen as the chat room 60 as a recommended task screen relevant to the 'e-mail' 1020, which is the extracted task-relevant word.

Figure 13:
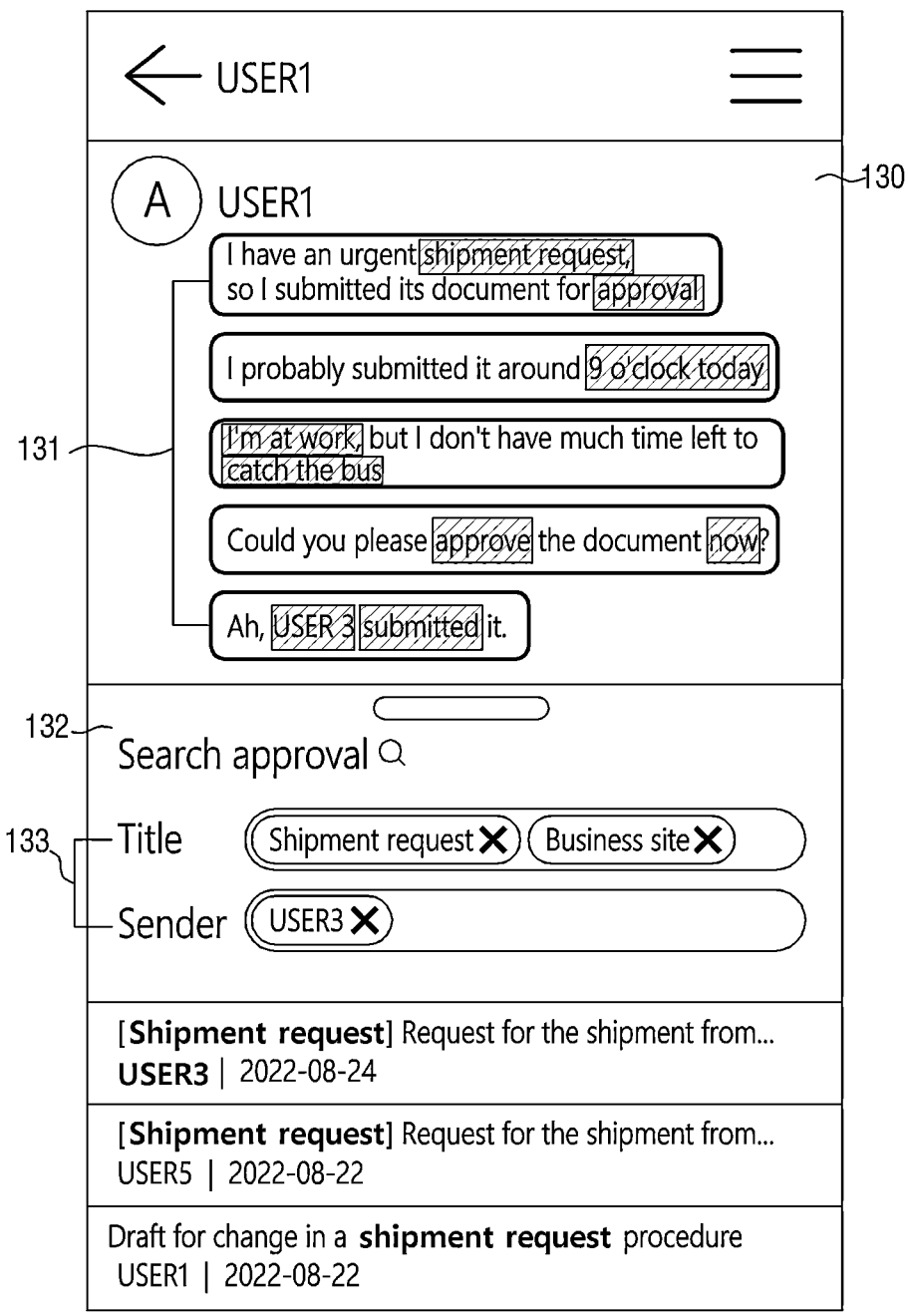
FIG. 13 is an example of providing a search screen of a payment system relevant to a conversation group according to some example embodiments of the disclosure.

As another example, as illustrated in FIG. 13, the messenger client terminal 10 may extract a 'payment', which is a task-relevant word included in a conversation group 131 created in a chat room 130, and display a 'payment search screen' 132, which is a recommended task screen relevant to the 'payment', on the same screen as the chat room 130.

Figure 5:
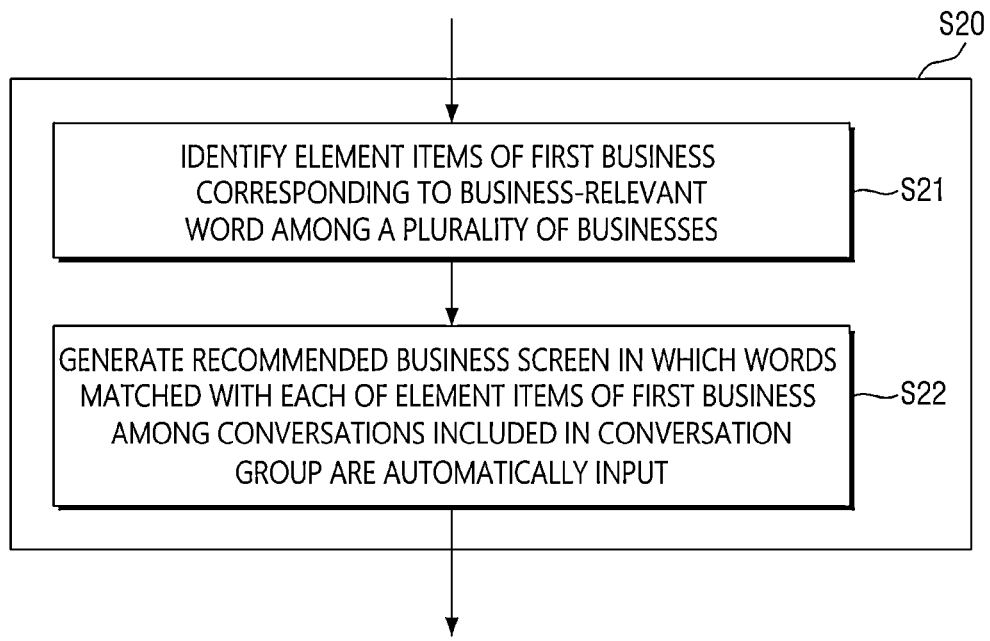

As an example embodiment, referring to FIG. 5, the operation S20 may include an operation S21 of identifying element items of a first task corresponding to the task-relevant word among a plurality of tasks and an operation S22 of generating a recommended task screen in which words matched with each of the element items of the first task among the conversations included in the conversation group are automatically input. As an example embodiment, information on the element items of the first task corresponding to the task-relevant word may be provided from the server 20 that stores information on each of the plurality of tasks.

Figure 11:
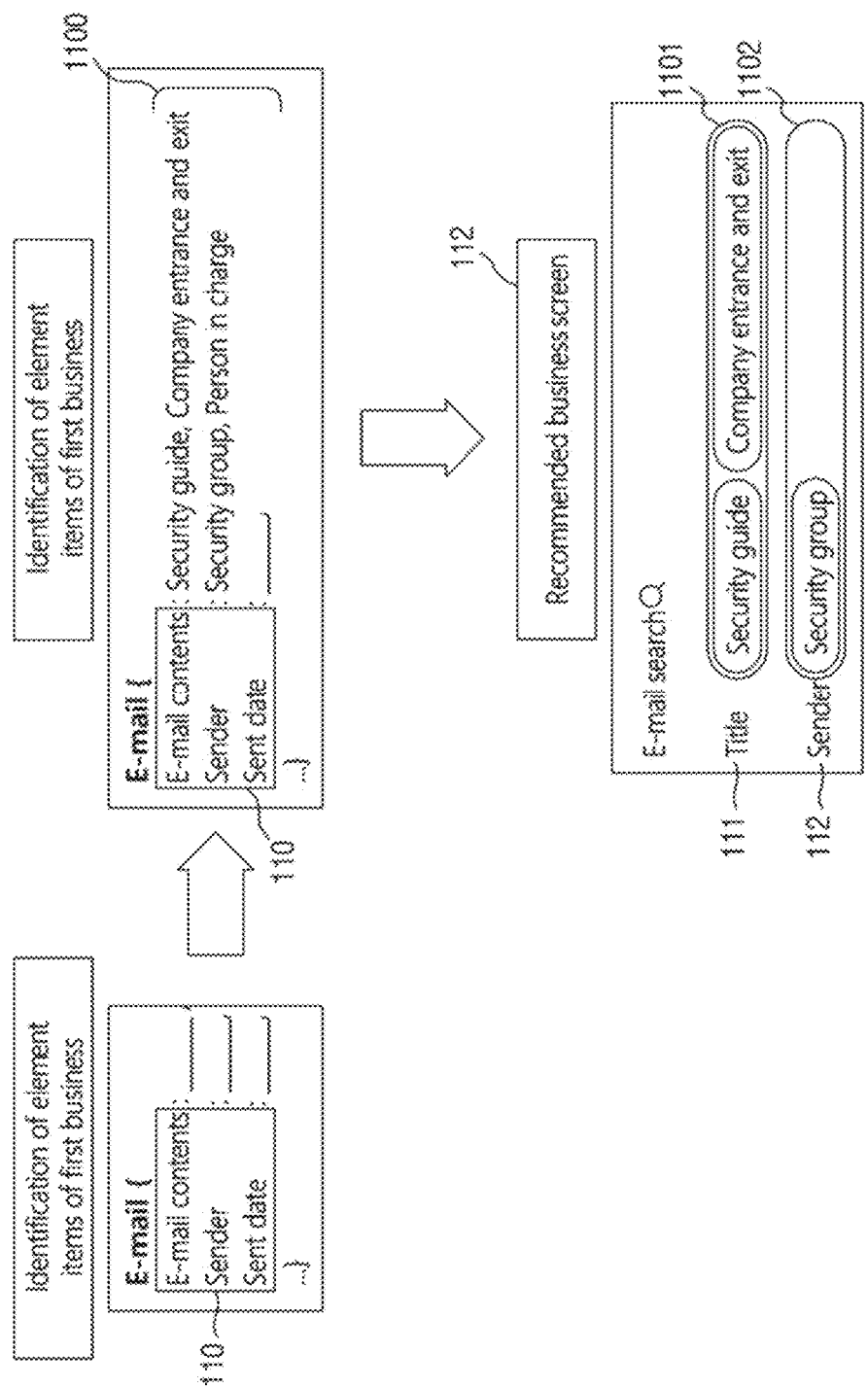
FIG. 11 is an example of creating a recommended task screen based on element items of a first task corresponding to the task-relevant word extracted in FIG. 10.

As an example, as illustrated in FIG. 11, the messenger client terminal 10 may identify 'e-mail contents', a 'sender', and a 'sent date' as element items 110 of an e-mail system, which is a task system corresponding to the 'e-mail' 1020, which is the task-relevant word extracted through FIG. 10.

In this case, the messenger client terminal 10 may select a 'security guide', a 'company entrance and exit', a 'security group', and a 'person in charge', which are words 1100 matched with each of the element items 110 of the e-mail system among words included in the conversations 1010 of the conversation group, and generate and display a recommended task screen 112 in which each selected word 1100 is automatically input to be matched with each element item 110.

Items 111 and 112 representing the element items 110 of the e-mail system may be displayed on the recommended task screen 112 generated as described above, and the 'security guide' and the 'company entrance and exit', which are matched words, may be automatically input and displayed in an input box 1101 of a 'title', which is a first item 111 of the items 111 and 112. In addition, the 'security group', which is a matched word, may be automatically input and displayed in an input box 1102 of a 'sender', which is a second item 112.

As an example embodiment, when the number of tasks relevant to the recommended task screen is two or more, the messenger client terminal 10 may sort and display the respective recommended task screens on the basis of the number of element items having matched words among element items of tasks displayed on the respective recommended task screens.

Figure 12:
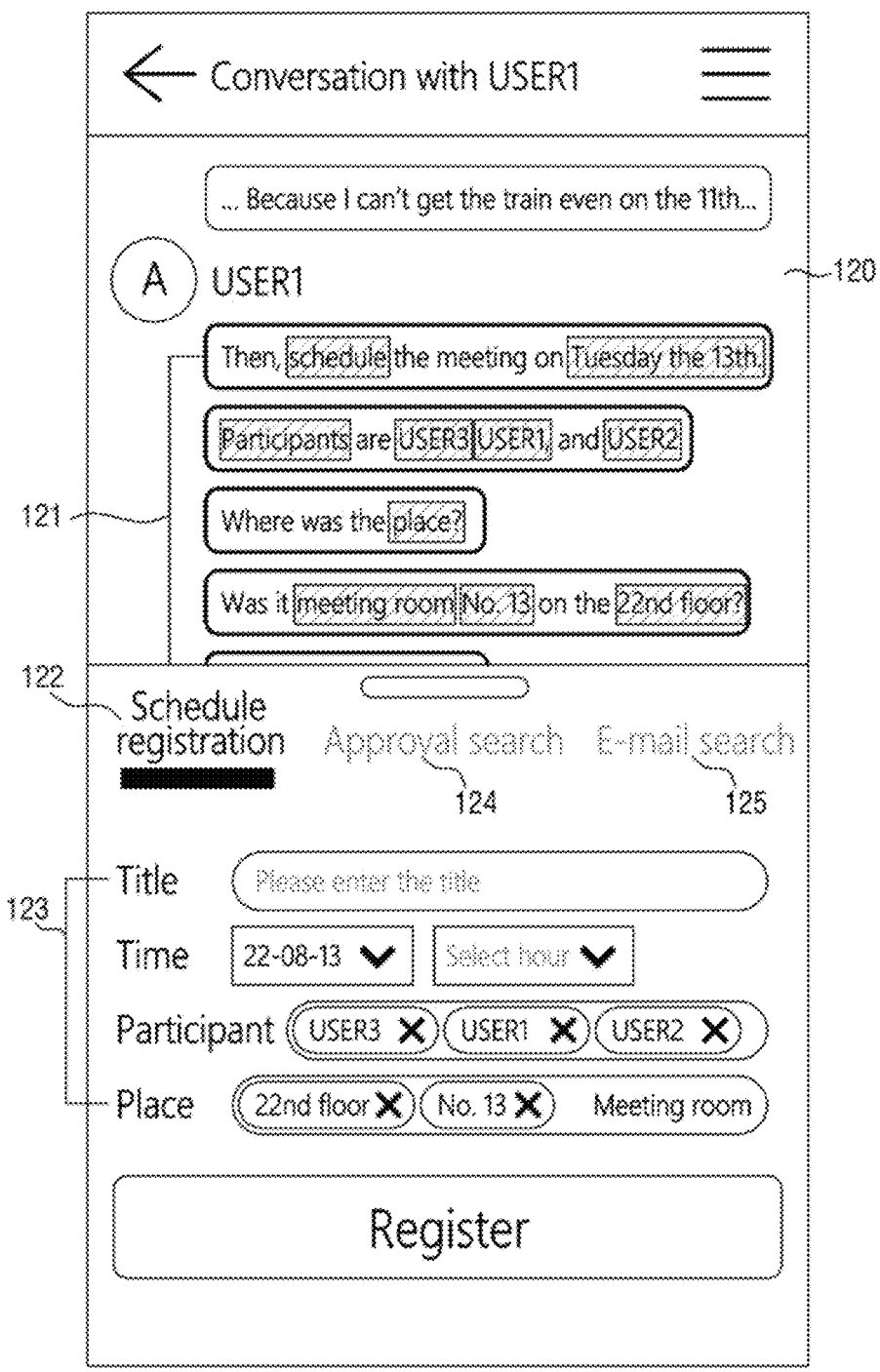
FIG. 12 is an example of providing a plurality of recommended task screens according to some example embodiments of the disclosure.

As an example, as illustrated in FIG. 12, the messenger client terminal 10 may create a conversation group 121 relevant to a first conversation of conversations in a chat room 120, and provide a plurality of recommended task screens such as a 'schedule registration screen' 122, a 'payment search screen' 124, and an 'e-mail search screen' 125 based on a task-relevant word included in the conversation group 121.

In this case, the messenger client terminal 10 may sort and display the recommended task screens in the order in which the number of element items having matched words is greatest among the plurality of recommended task screens. For example, the 'schedule registration screen' 122 may be displayed in a first priority, and the 'payment search screen' 124 and the 'e-mail search screen' 125 may be displayed in the next priority. Here, the respective recommended task screens 122, 124, and 125 may be selected in a manner of selecting a menu or a tab on the top, and when one of the recommended task screens 122, 124, and 125 is selected, the selected recommended task screen may be activated and displayed.

As an example embodiment, the messenger client terminal 10 may allow matched words of words of the conversation group 121 to be automatically input into each input box of items 123 corresponding to each of element items related to a schedule registration system in the 'schedule registration screen' 122 of FIG. 12. Here, in the case of a 'title' and a 'time' that do not have a matched word, a user's input may be directly received.

Similarly, in an example of FIG. 13, the messenger client terminal 10 shows a state in which matched words are automatically input into each input box of a 'title' and a 'sender', which are element items 133 related to a payment system in a 'payment search screen' 132 displayed together with the chat room 130.

As an example embodiment, the messenger client terminal 10 may increase a range of the conversations included in the conversation group when the number of element items that do not have a matched word among the element items displayed on the recommended task screen is greater than or equal to a reference value. In this case, in order to increase the range of the conversations included in the conversation group, the weights applied when calculating the conversation relevance score may be adjusted.

According to the example embodiment of the present disclosure as described above, it is possible to provide a convenient interface so as to access a task system relevant to conversation contents without moving to another screen during a conversation on the messenger. In addition, it is possible to recommend a task system having high linkage even when a range of conversations having the same subject is ambiguous during a conversation on the messenger.

Figure 14:
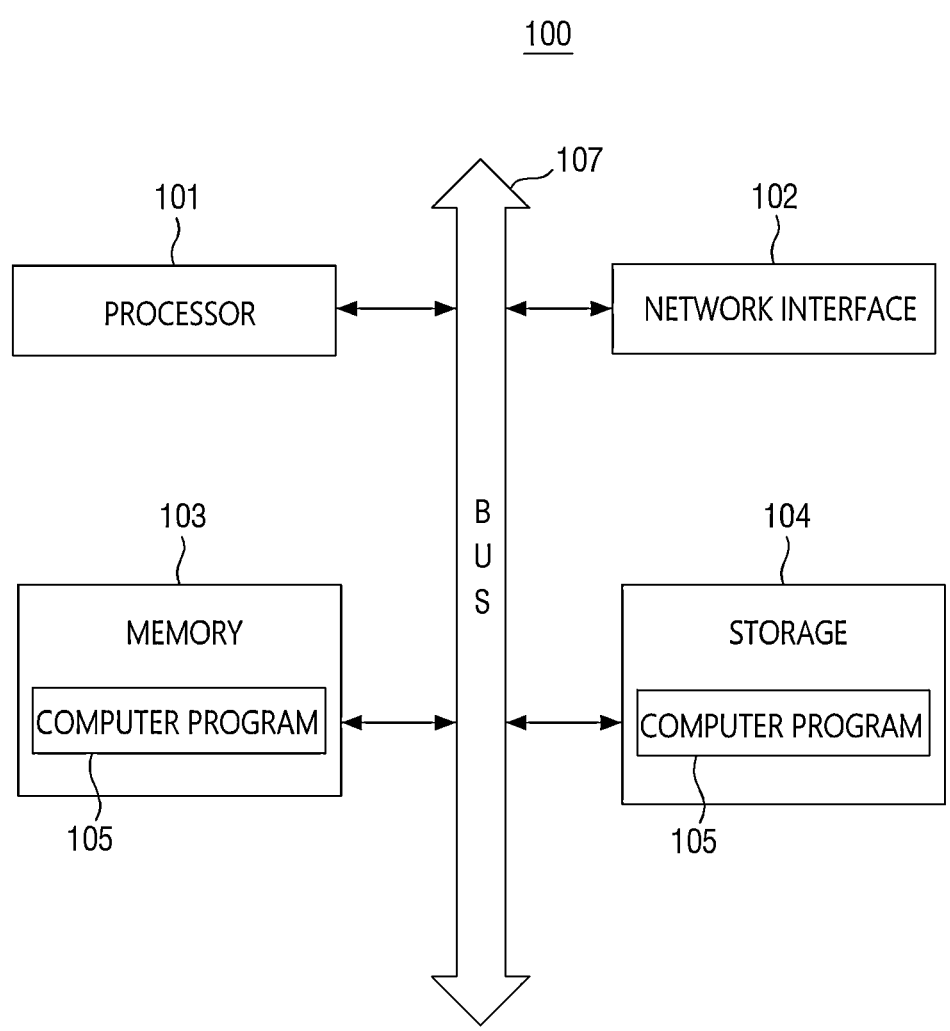
FIG. 14 is a hardware configuration diagram of an illustrative computing apparatus capable of implementing methods according to an example embodiment of the disclosure.

FIG. 14 is a hardware configuration diagram of an example computing device 100.

Referring to FIG. 14, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the disclosure. The computing device 100 may have one or more processors.

The memory 103 stores various data, instructions and/or information. The memory 103 may load one or more programs 105 from the storage 104 to execute methods/operations according to various embodiments of the disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the disclosure are implemented. When the computer program 105 is loaded on the memory 103, the processor 101 may perform the methods/operations in accordance with various embodiments of the disclosure by executing the one or more instructions.

As an example embodiment, a computer program 105 may include instructions for performing an operation of creating a conversation group by grouping conversations relevant to a first conversation of a plurality of conversations displayed in a chat room and an operation of providing at least one recommended task screen based on a task-relevant word included in the conversation group.

The technical features of the disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the disclosure. Therefore, the disclosed preferred embodiments of the disclosure are used in a generic and descriptive sense only and not for purposes of limitation.

What is claimed is:

1. A method for providing a messenger service, the method being performed by at least one processor and comprising:
   in a state in which a plurality of conversations are displayed in a chat room, receiving a user operation on a first conversation of the plurality of conversations;
   responsive to the user operation, creating a conversation group by grouping conversations relevant to the first conversation; and
   providing, on a same screen as the chat room, at least one recommended target screen based on a target-relevant word included in the conversation group,
   wherein the at least one recommended target screen includes input fields for element items based on which a task corresponding to the at least one recommended target screen is to be performed, and
   wherein the providing of the at least one recommended target screen comprises:
   identifying a first target task corresponding to the target-relevant word among a plurality of target tasks;
   identifying element items of the first target task based on information received from an external server; and
   generating the at least one recommended target screen in which words matched with each of the element items of the first target task among the conversations included in the conversation group are automatically input to corresponding input fields.

2. The method of claim 1, wherein the creating of the conversation group comprises:
   calculating conversation relevance scores to the first conversation for each of the conversations in the chat room; and
   creating the conversation group based on conversations in which a difference in the conversation relevance scores between neighboring conversations is greater than or equal to a first reference value.

3. The method of claim 2, wherein the calculating of the conversation relevance scores to the first conversation comprises calculating the conversation relevance scores based on at least one of a first relevance index, a second relevance index, or a third relevance index between each of the conversations in the chat room and the first conversation,
   wherein the first relevance index is calculated based on a common word between the first conversation and another conversation,
   wherein the second relevance index is calculated based on a time difference between the first conversation and another conversation, and
   wherein the third relevance index is calculated based on a distance between the first conversation and another conversation.

4. The method of claim 3, wherein the calculating of the conversation relevance scores based on at least one of the first relevance index, the second relevance index, or the third relevance index comprises:
   determining weights for each of the first relevance index, the second relevance index, and the third relevance index; and
   calculating the conversation relevance scores to the first conversation by performing, based on the determined weights, a weighted sum on the first relevance index, the second relevance index, and the third relevance index.

5. The method of claim 4, wherein the creating of the conversation group comprises, based on a determination that there are no conversations in which the difference in the conversation relevance scores between the neighboring conversations is greater than or equal to the first reference value among the conversations in the chat room, adjusting the determined weights.

6. The method of claim 3, wherein the calculating of the conversation relevance scores based on at least one of the first relevance index, the second relevance index, or the third relevance index comprises:
   based on a determination that an utterer is the same as an utterer of the first conversation for each of the conversations in the chat room, calculating a fourth relevance index to the first conversation; and
   calculating the conversation relevance scores based on at least one of the first relevance index, the second relevance index, or the third relevance index, and the fourth relevance index.

7. The method of claim 6, wherein the calculating of the conversation relevance scores based on at least one of the first relevance index, the second relevance index, or the third relevance index, and the fourth relevance index comprises:
   based on a determination that the fourth relevance index is lower than a second reference value, adjusting a weight for at least one of the first relevance index, the second relevance index, or the third relevance index; and calculating the conversation relevance scores by performing, based on the adjusted weight, a weighted sum on the first relevance index, the second relevance index, the third relevance index, and the fourth relevance index.

8. The method of claim 1, wherein the providing of the at least one recommended target screen comprises, based on a determination that a number of target tasks relevant to the at least one recommended target screen is two or more, sorting and displaying respective recommended target screens based on a number of element items comprising a matched word among element items of tar-gets-target tasks displayed on the respective recommended target screens.

9. The method of claim 1, wherein the generating of the at least one recommended target screen comprises receiving an input for an element item that does not have the matched word among the element items of the first target task and displaying the at least one recommended target screen.

10. The method of claim 1, further comprising, based on a determination that a number of element items that do not have the matched word among the element items of the first target task is greater than or equal to a reference value, increasing a range of the conversations included in the conversation group.

11. The method of claim 1, wherein the creating of the conversation group comprises creating the conversation group based on a user's input selecting the first conversation.

12. The method of claim 1, wherein the creating of the conversation group comprises, based on a determination that the first conversation comprises the target-relevant word, creating the conversation group.

13. The method of claim 1, wherein the providing of the at least one recommended target screen comprises:
receiving information on the element items of the first target task corresponding to the target-relevant word from the external server that stores information on each of the plurality of target tasks; and
generating the at least one recommended target screen using the received information on the element items of the first target task.

14. A non-transitory computer-readable recording medium storing computer program, which, when executed by at least one processor, causes the at least one processor to execute:
in a state in which a plurality of conversations are displayed in a chat room, receiving a user operation on a first conversation of the plurality of conversations;
responsive to the user operation, create a conversation group by grouping conversations relevant to the first conversation; and
provide, on a same screen as the chat room, at least one recommended target screen based on a target-relevant word in the conversation group,
wherein the at least one recommended target screen includes input fields for element items based on which a task corresponding to the at least one recommended target screen is to be performed, and
wherein the computer program causes the at least one processor to provide the at least one recommended target screen by performing:

identifying a first target task corresponding to the target-relevant word among a plurality of target tasks;
identifying element items of the first target task based on information received from an external server; and
generating the at least one recommended target screen in which words matched with each of the element items of the first target task among the conversations included in the conversation group are automatically input to corresponding input fields.

15. A messenger client terminal comprising:
one or more processors;
a communication interface configured to communicate with an external apparatus; and
a memory configure to load a computer program executable by the one or more processors,
wherein the computer program comprises instructions for performing:
in a state in which a plurality of conversations are displayed in a chat room, receiving a user operation on a first conversation of the plurality of conversations;
responsive to the user operation, creating a conversation group by grouping conversations relevant to the first conversation; and
providing, on a same screen as the chat room, at least one recommended target screen based on a target-relevant word included in the conversation group,
wherein the at least one recommended target screen includes input fields for element items based on which a task corresponding to the at least one recommended target screen is to be performed, and
wherein the providing of the at least one recommended target screen comprises:
identifying a first target task corresponding to the target-relevant word among a plurality of target tasks;
identifying element items of the first target task based on information received from the external apparatus; and
generating the at least one recommended target screen in which words matched with each of the element items of the first target task among the conversations included in the conversation group are automatically input to corresponding input fields.

16. The messenger client terminal of claim 15, wherein the creating of the conversation group comprises:
calculating a conversation relevance score to the first conversation based on a common word between the first conversation and another conversation, and
creating the conversation group based on the calculated conversation relevance score.

17. The messenger client terminal of claim 15, wherein the providing of the at least one recommended target screen comprises:
receiving information on the element items of the first target task corresponding to the target-relevant word from the external apparatus that stores information on each of the plurality of target tasks, and
generating the at least one recommended target screen in which words matched with each of the element items of the first target task among the conversations included in the conversation group are automatically input.

* * * * *